(12) United States Patent
Jin

(10) Patent No.: US 9,191,491 B2
(45) Date of Patent: Nov. 17, 2015

(54) METHOD AND COMMUNICATION TERMINAL APPARATUS FOR DISPLAYING FUNCTION IN COMMUNICATION

(71) Applicant: Samsung Electronics Co., Ltd., Gyeonggi-do (KR)

(72) Inventor: Jeong-Gyu Jin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/248,993

(22) Filed: Apr. 9, 2014

(65) Prior Publication Data
US 2014/0221053 A1    Aug. 7, 2014

Related U.S. Application Data

(63) Continuation of application No. 10/829,791, filed on Apr. 22, 2004.

(30) Foreign Application Priority Data

Jul. 21, 2003 (KR) .................. 10-2003-0049849

(51) Int. Cl.
*H04B 1/38* (2006.01)
*H04M 1/725* (2006.01)

(52) U.S. Cl.
CPC ...... *H04M 1/72583* (2013.01); *H04M 1/72597* (2013.01)

(58) Field of Classification Search
CPC .......... H04M 1/0266; H04M 1/72547; H04M 2250/18; H04M 2250/22
USPC ....................................... 455/567
See application file for complete search history.

(56) References Cited

U.S. PATENT DOCUMENTS

| 5,737,394 A | 4/1998 | Anderson et al. |
| 5,892,475 A | 4/1999 | Palatsi |

(Continued)

FOREIGN PATENT DOCUMENTS

| EP | 1094410 | 4/2001 |
| KR | 1020010111671 | 12/2001 |
| KR | 1020020019132 | 3/2002 |

OTHER PUBLICATIONS

IM-1100 User Manual.

(Continued)

*Primary Examiner* — Kwasi Karikari
(74) *Attorney, Agent, or Firm* — The Farrell Law Firm, P.C.

(57) ABSTRACT

A mobile communication terminal and method are provided for receiving an incoming voice call and for displaying a notification, an incoming phone number, and an elapsed voice communication time during an incoming voice communication. The method includes receiving a call request from a base station; responding to the call request, to perform a call-setup with the base station; in response to the call-set up, automatically displaying a plurality of icons together with the notification, the incoming phone number, and the elapsed voice communication time, wherein the plurality of icons are respectively associated with voice communication related functions, and wherein at least one of the plurality of icons includes a graphic symbol portion and a text portion; receiving an input for selecting one of the plurality of icons; and performing a voice communication related function associated with the selected icon while in the incoming voice communication.

20 Claims, 4 Drawing Sheets

(56) References Cited

U.S. PATENT DOCUMENTS

| | | |
|---|---|---|
| 6,317,593 B1 | 11/2001 | Vossler |
| 6,396,531 B1 * | 5/2002 | Gerszberg et al. ......... 348/14.01 |
| 6,879,828 B2 | 4/2005 | Virtanen et al. |
| 6,907,276 B2 | 6/2005 | Toba |
| 6,931,258 B1 | 8/2005 | Jarnstrom et al. |
| 7,295,852 B1 | 11/2007 | Davis et al. |
| 2002/0065069 A1 | 5/2002 | Phillips |
| 2002/0077158 A1 | 6/2002 | Scott |
| 2002/0183091 A1 * | 12/2002 | Heo ............................. 455/556 |
| 2003/0008679 A1 | 1/2003 | Iwata et al. |
| 2003/0073430 A1 | 4/2003 | Robertson et al. |
| 2003/0133562 A1 | 7/2003 | Ooki |
| 2003/0157970 A1 | 8/2003 | Kraft et al. |
| 2004/0047461 A1 * | 3/2004 | Weisman et al. ........ 379/202.01 |
| 2004/0203674 A1 | 10/2004 | Shi et al. |

OTHER PUBLICATIONS

IM-1100 User Manual, Dec. 1999.

U.S. Office Action dated Aug. 26, 2015 issued in counterpart U.S. Appl. No. 14/755,421, 20 pages.

\* cited by examiner

METHOD AND COMMUNICATION TERMINAL APPARATUS FOR DISPLAYING FUNCTION IN COMMUNICATION

PRIORITY

This application is Continuation Application of U.S. application Ser. No. 10/829,791, which was filed in the U.S. Patent and Trademark Office on Apr. 22, 2004, and claims priority under 35 U.S.C. §119(a) to Korean Patent Application Serial No. 10-2003-0049849, which was filed in the Korean Industrial Property Office on Jul. 21, 2003, the content of each of which is hereby incorporated by reference.

BACKGROUND OF THE INVENTION

1. Field of the Invention

The present invention relates to a method and communication terminal apparatus for displaying a function in communication, more particularly to a method and communication terminal apparatus capable of displaying and selecting functions which can be performed in communication.

2. Description of the Related Art

In general, a communication terminal apparatus such as a portable telephone or a wire/wireless telephone provides functions which can be performed in communication (hereinafter, referred to as 'function in communication'). For instance, the function list in communication may include a telephone directory, a transmission/reception volume control, a transmission sound interception (i.e. "mute") and a key sound control.

However, conventional communication terminals do not positively inform a user of such a function in communication. For instance, in order to use the function in communication, a user calling by means of the conventional communication terminal must display menus with respect to the function in communication through a separate key operation. Then, the user must select a desired function in communication from among the menus displayed by the result of the key operation.

FIG. 1 is an exemplary view regarding a screen in communication of a conventional portable telephone. Referring to FIG. 1, a portable telephone in communication displays an antenna bar representing a reception intensity of the portable telephone, a communication state, a power state of the portable telephone, a communication time of a corresponding communication and a telephone number of a counterpart. FIG. 1 shows, as an example, a portable telephone that includes a display unit for displaying items as described above.

That is, in the prior art, since the communication terminals in communication displays only communication information with respect to a corresponding communication, users can't conveniently use or readily be informed of function in communication. Furthermore, there have been users who have not known the function in communication itself. Therefore, there have been many users who are unable to effectively use such communication terminal apparatuses.

SUMMARY OF THE INVENTION

Accordingly, the present invention has been made to solve the above-mentioned problems occurring in the prior art, and a primary object of the present invention is to provide a method and a communication terminal apparatus, which enable a user to effectively use the communication terminal apparatus.

Another object of the present invention is to provide a method and a communication terminal apparatus, which enable users to conveniently use a function in communication.

In order to accomplish the aforementioned objects, according to an embodiment of the present invention, there is provided a mobile communication terminal operable for receiving an incoming voice call and for displaying a notification, an incoming phone number, and an elapsed voice communication time during a voice communication for the incoming voice call. The mobile communication terminal includes a display unit; a mobile communication unit for performing voice communication; and a processor configured to receive a call request from a base station via the mobile communication unit, respond to the call request via the mobile communication unit to perform a call-setup with the base station, in response to the call-set up, control the display unit to automatically display a plurality of icons together with the notification, the incoming phone number, and the elapsed voice communication time, wherein the plurality of icons are respectively associated with voice communication related functions, wherein at least one of the plurality of icons includes a graphic symbol portion and a text portion, and wherein the notification indicates a network state and a battery state, receive an input for selecting one of the plurality of icons, and perform a voice communication related function associated with the selected icon while in the incoming voice communication.

According to another embodiment of the present, there is also provided a method of a mobile communication terminal for receiving an incoming voice call and for displaying a notification, an incoming phone number, and an elapsed voice communication time during a voice communication for the incoming voice call. The method includes receiving a call request from a base station; responding to the call request, to perform a call-setup with the base station; in response to the call-set up, automatically displaying a plurality of icons together with the notification, the incoming phone number, and the elapsed voice communication time, wherein the plurality of icons are respectively associated with voice communication related functions, wherein at least one of the plurality of icons includes a graphic symbol portion and a text portion, and wherein the notification indicates a network state and a battery state; receiving an input for selecting one of the plurality of icons; and performing a voice communication related function associated with the selected icon while in the incoming voice communication.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, various embodiments according to the present invention will be described with reference to the accompanying drawings. In the following description of the present invention, a detailed description of known functions and configuration incorporated herein are omitted to avoid making the subject matter of the present invention unclear.

Figure 1:
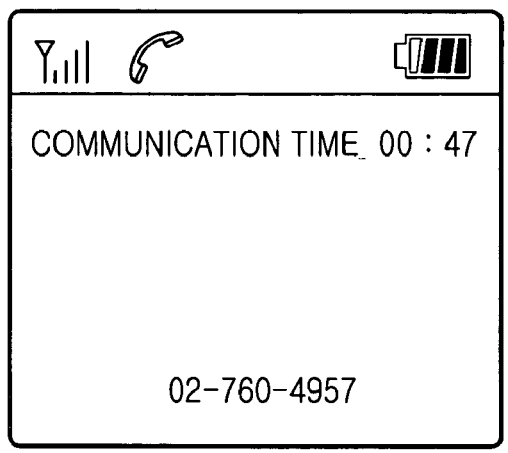
FIG. 1 is an exemplary view regarding a screen in communication of a conventional portable telephone.
Figure 2:
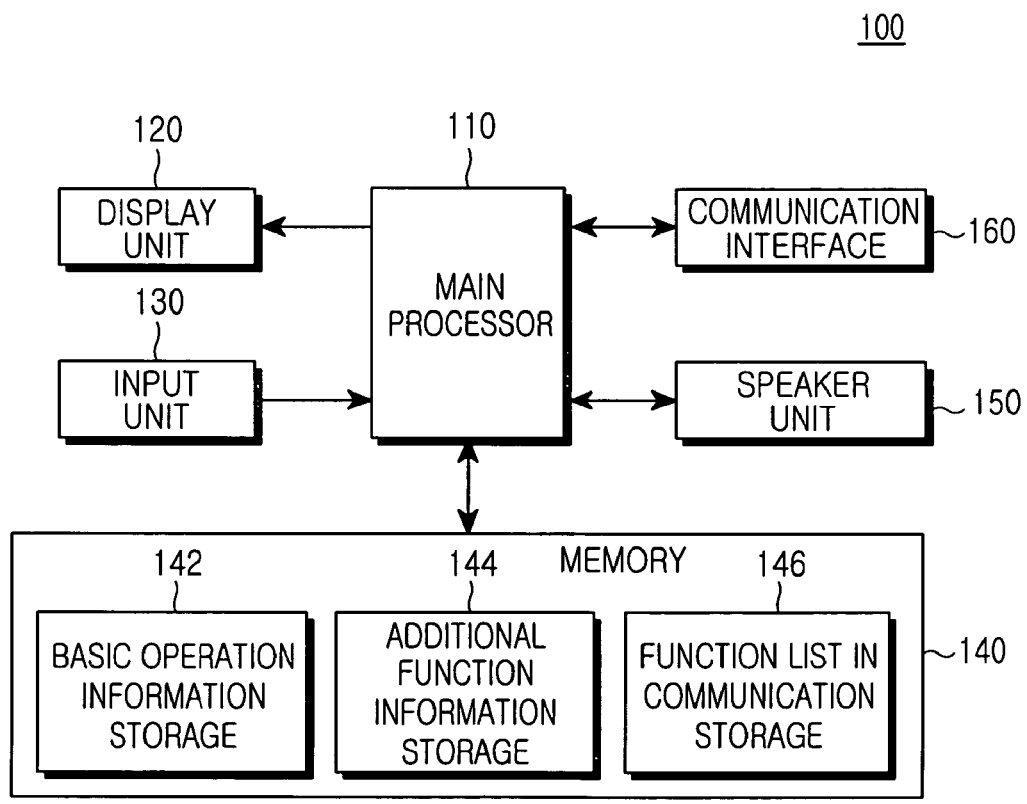
FIG. 2 is a block diagram showing a construction of a communication terminal apparatus according to an embodiment of the present invention.

FIG. 2 is a block diagram showing a construction of a communication terminal apparatus, which displays a function in communication, according to an embodiment of the present invention. Referring to FIG. 2, the communication terminal 100 according to an embodiment of the present invention includes a main processor 110, a display unit 120, an input unit 130, a memory 140, a speaker unit 150 and a communication interface unit 160.

The input unit 130 and the speaker unit 150 provide an interface between the communication terminal 100 and a user, and they are commonly included in general communication terminal apparatuses, such as a wire/wireless telephone or a portable telephone, together with a microphone unit (not shown). Accordingly, a detailed description regarding the input unit 130 and the speaker unit 150 is omitted.

The display unit 120 displays an operation state of the communication terminal 100 and an input item provided from a user, and particularly displays communication information when the communication terminal 100 is on line.

The communication interface unit 160 provides a communication interface between the communication terminal 100 and an outside network connection device (not shown). Herein, the outside network connection device supports a call service between a communication terminal apparatus and a network, such as a telephone exchange in a public switched telephone network and a base station in a mobile telephone network. A detailed description regarding the outside network connection device is omitted.

The memory 140 stores and manages operation information including basic operation information, additional function information and a function list in communication. Herein, the basic operation information includes information for supporting a call service function which is an inherent function of the communication terminal 100. The additional function information are services, such as an alarm, a morning call or a telephone directory, which can be provided by the communication terminal 100 in addition to the call service function. The function list in communication is a list for items of functions (so-called "in-communication functions") which can be selected and performed from among the additional functions while the communication terminal 100 is in communication. Herein, the function in communication may include a telephone directory, a transmission/reception volume control, a transmission sound interception (i.e. "mute") and a key sound control, a transmission of self number, a call shift, a call holding, conference call, call recording, Dual Tone Multi-Frequency (DTMF), memo, etc. A transmission of self number is used to send the self number. DTMF is used to send the number inputted by the user as a DTMF tone signal. A call shift is used to connect an incoming call and hold with a current call (i.e. shift between a current call and an incoming call). A call holding is used to hold a current call.

In order to perform such functions, the memory 140 includes a basic operation information storage 142 for storing and managing the basic operation information, an additional function information storage 144 for storing and managing the additional function information, and a function list in communication storage 146 for storing and managing the function list in communication.

The main processor 110 preferably controls the entire operation of the communication terminal 100. Particularly, when an operation mode of the communication terminal 100 changes from a communication waiting mode to a communication mode, the main processor 110 reads a menu (hereinafter, a menu in communication) capable of selecting the function in communication from the function list in communication storage 146 and displays the menu on the display unit 120.

Further, the main processor 110 may modify the function list in communication on the basis of an operation signal of a user inputted through the input unit 130. For instance, the main processor 110 deletes an item, which a user wants to delete, from among items included in a predetermined function list in communication, and the main processor 110 adds an item, which a user wants to add, to a predetermined function list in communication. Particularly, for additional modification of the function list in communication, the main processor 110 reads an item, which can be added to the function list in communication, from the additional function information storage 144 and provides the item to a user.

Figure 3:
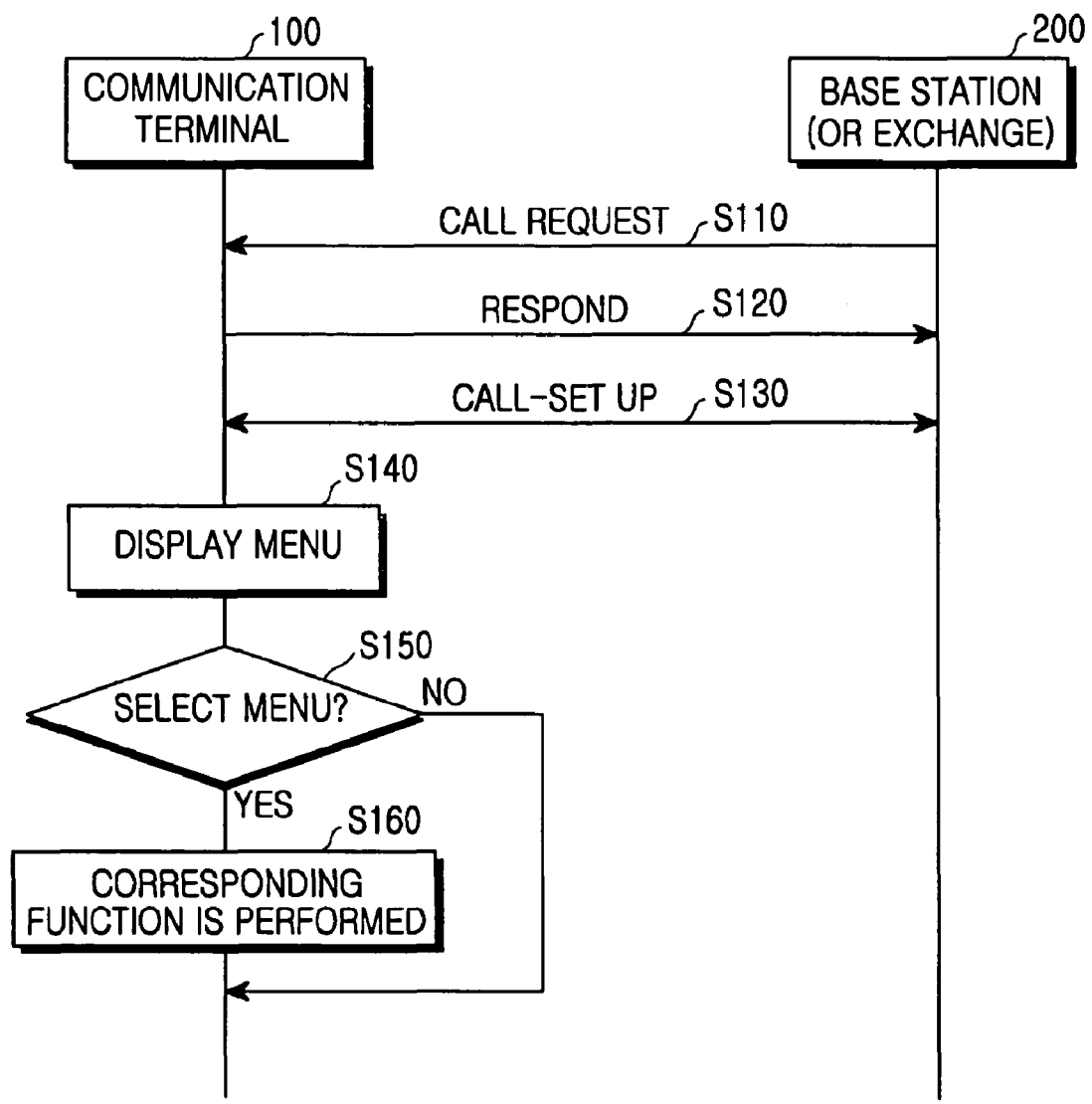
FIG. 3 is a flowchart illustrating a display method of a function in communication of a communication terminal apparatus according to an embodiment of the present invention.

FIG. 3 is a flowchart illustrating a display method of a function in communication of a communication terminal 100 according to an embodiment of the present invention. In the example in FIG. 3, a network connection device for supporting a call service between the communication terminal 100 and a network is shown as a base station (or an exchange) (hereinafter, referred to as a base station 200).

Referring to FIG. 3, when the communication terminal 100 having received a call request (S110) from the base station 200 responds with respect to the request (S120), a call-set up for calling is performed between the communication terminal 100 and the base station 200 (S130). Through steps S110 to S130, a general call-set up process was briefly described, but a call-set up process is not limited to the method exemplified in FIG. 3.

Next, when the call-set up is performed between the communication terminal 100 and the base station 200 through the aforementioned steps, an operation mode of the communication terminal 100 changes from a communication waiting mode to a communication mode. Then, the communication terminal 100 reads an already stored function list in communication from the function list in communication storage 146 in the memory 140 and then displays the list as a menu on the display unit 120 (S140). Herein, it is preferred that the function list in communication is displayed by a text type or an icon type.

Next, when a user selects a desired menu from among the function list in communication (S150), a function corresponding to the selection is performed (S160).

Also, the communication terminal 100 may enable the function list in communication to be displayed according to a predetermined display time. For instance, the function list in communication is displayed just after an operation mode of the communication terminal 100 changes to a communication mode, but the function list in communication is displayed during a predetermined display time. Herein, when information selected by a user is not inputted during the display time, the communication terminal 100 may enable the function list in communication to be deleted on a screen. Further, the communication terminal 100 may enable the function list in communication to be periodically displayed according to a predetermined display time interval.

Further, when a user does not want to display the function list in communication, the communication terminal 100 may be set according to information selected by a user so that the communication terminal 100 does not display the function list in communication even if an operation mode of the communication terminal 100 changes to a communication mode.

Figure 4:
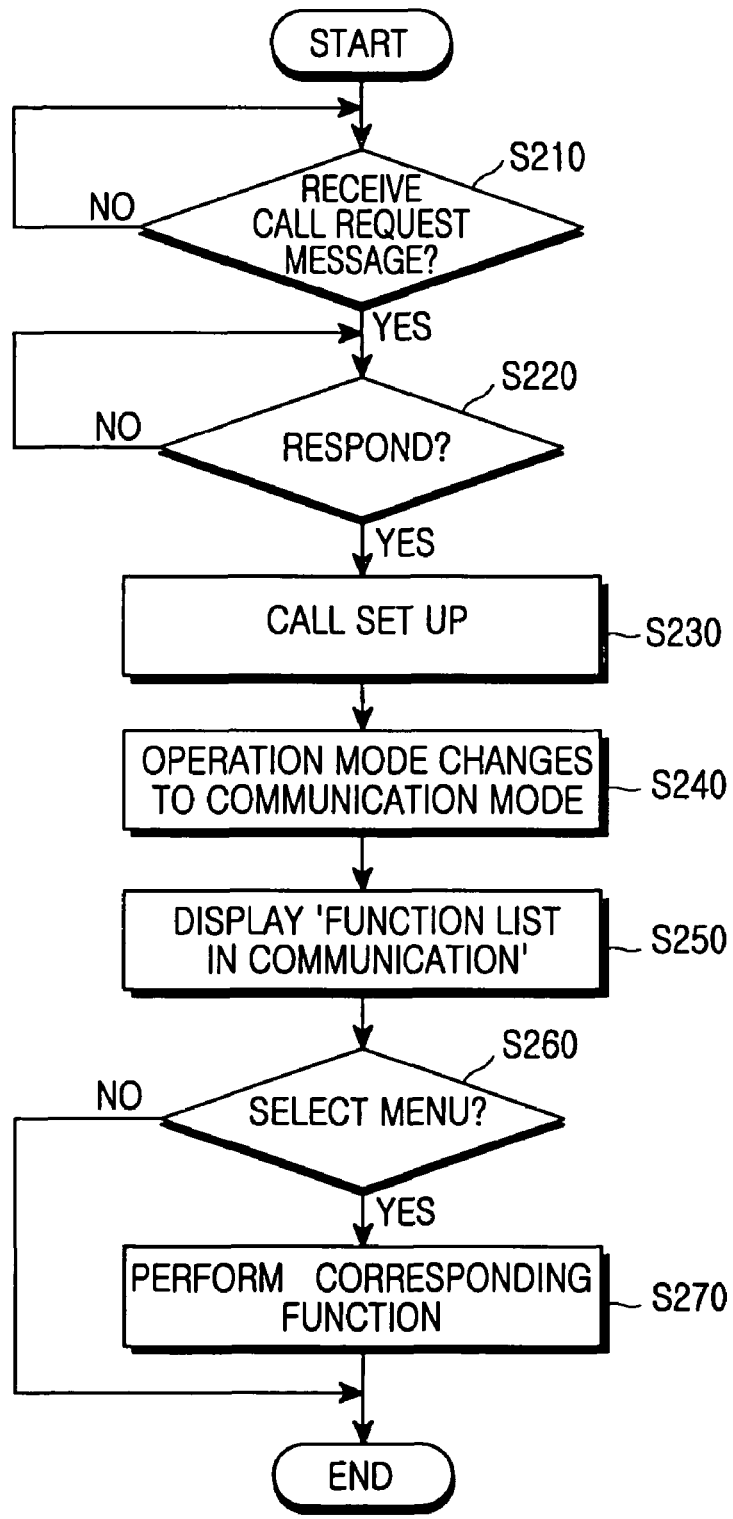
FIG. 4 is a flowchart illustrating a method for displaying a function in communication in a communication terminal apparatus according to an embodiment of the present invention.

FIG. 4 is a flowchart illustrating a method for displaying a function in communication in a communication terminal apparatus according to an embodiment of the present invention. Referring to FIG. 4, the communication terminal 100 receives a call request message from an outside network connection device such as a base station or an exchange (S210) and responds with respect to the request (S220). As a result of the response, when a call-set up is performed between the communication terminal 100 and the outside network connection device (S230), an operation mode of the communication terminal 100 changes to a communication mode (S240). That is, the operation mode of the communication terminal 100 changes from a communication waiting mode to a communication mode. Then, the communication terminal 100 reads a function list in communication stored in advance from the memory 140 and displays the function list in communication (S250).

Further, when a user selects an item that the user wants to perform from the function list in communication (S260), a function corresponding to the selection is performed (S270).

Further, though not shown in drawings, the communication terminal 100 can modify the function list in communication on the basis of request of a user. For instance, according to a user's command to add/delete the function list in communication, it is possible that a menu selected by the user is added to the function list in communication or a corresponding menu is deleted from the function list in communication.

Figure 5A:
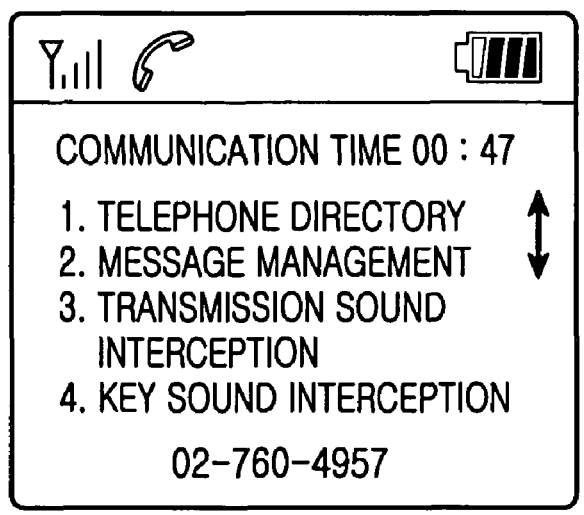
FIGS. 5A and 5B are exemplary views regarding a screen in communication of a portable telephone according to an embodiment of the present invention.
Figure 5B:
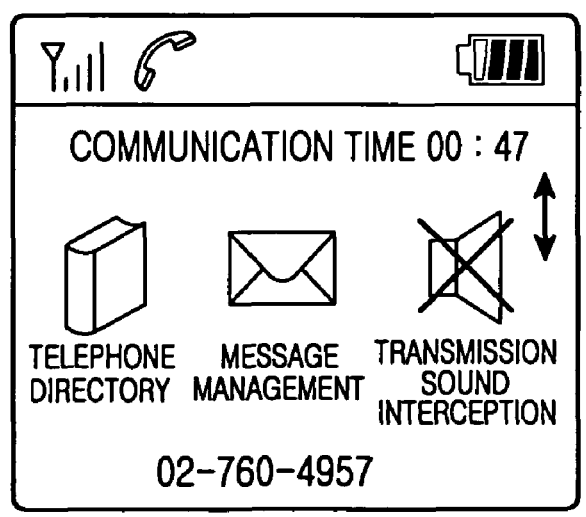

FIGS. 5A and 5B are exemplary views regarding a screen in communication of a portable telephone according to an embodiment of the present invention. That is, FIGS. 5A and 5B show an example in which a function list in communication is displayed on a portable telephone in communication. FIG. 5A shows an example in which the function list in communication is displayed by a text type and FIG. 5B shows an example in which the function list in communication is displayed by an icon type.

In a method and communication terminal apparatus for displaying a function in communication according to the present invention, the function in communication is automatically informed to a user, thereby enabling a user to conveniently use the function in communication. Accordingly, in the present invention, a user can effectively use the communication terminal apparatus. Further, a user can select the function in communication, thereby realizing an operation environment of a communication terminal apparatus according to the user's individual preferences.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile communication terminal operable for receiving an incoming voice call, the mobile communication terminal comprising:
a display unit;
a communication interface; and
a processor configured to,
when a call request for a voice call between the mobile communication terminal and a counterpart is received from a base station via the communication interface, respond to the call request via the communication interface and then perform call-set up with the base station via the communication interface,
once the voice call between the mobile communication terminal and the counterpart has been set up, control the display unit to automatically display a plurality of icons together with a notification indicating a network state and a battery state, an incoming phone number of the voice call, and an elapsed time of the voice call, wherein the plurality of icons are respectively associated with voice call related functions, and the processor is further configured to control the display unit to start to display the plurality of icons associated with the voice call related functions after the voice call between the mobile communication terminal and the counterpart is set up,
wherein each of the plurality of icons includes a graphic symbol portion and a text portion,
wherein all of the incoming phone number, the elapsed time, and the plurality of icons are displayed below the notification during the voice call, and
when an input selecting one of the plurality of icons is received during the voice call, perform a voice call related function associated with the selected icon.

2. The mobile communication terminal of claim 1, wherein the processor controls the display unit to stop display of the plurality of icons on the display unit.

3. The mobile communication terminal of claim 1, wherein the voice call related functions include at least one of a mute function and a phone directory.

4. A mobile communication terminal operable for receiving an incoming voice call, the mobile communication terminal comprising:
a display unit;
a communication interface; and
a processor configured to,
when a call request is received from a base station via the communication interface, respond to the call request via the communication interface and then perform call-set up with the base station via the communication interface,
once a call has been set up, control the display unit to automatically display a plurality of icons together with a notification indicating a network state and a battery state, an incoming phone number of the call, and an elapsed time of the call,
wherein the plurality of icons are respectively associated with voice communication related functions, and
wherein at least one of the plurality of icons includes a graphic symbol portion and a text portion,
when an input selecting one of the plurality of icons is received during a call, perform a voice communication related function associated with the selected icon; and
when a predefined condition is met, control the display unit to prevent display of at least one of the plurality of icons during a call.

5. The mobile communication terminal of claim 4, wherein the predefined condition comprises a user not inputting a selection from the plurality of icons for a predetermined display time.

6. The mobile communication terminal of claim 4, wherein the predefined condition comprises a user having previously deleted the at least one icon from the plurality of icons to be displayed during a call.

7. A mobile communication terminal operable for receiving an incoming voice call, the mobile communication terminal comprising:
- a display unit;
- a communication interface; and
- a processor configured to,
  - when a call request is received from a base station via the communication interface, respond to the call request via the communication interface and then perform call-set up with the base station via the communication interface,
  - once a call has been set up, control the display unit to automatically display a plurality of icons together with a notification indicating a network state and a battery state, an incoming phone number of the call, and an elapsed time of the call,
    - wherein the plurality of icons are respectively associated with voice communication related functions, and
    - wherein at least one of the plurality of icons includes a graphic symbol portion and a text portion,
  - when an input selecting one of the plurality of icons is received during a call, perform a voice communication related function associated with the selected icon; and
  - when a predetermined display time elapses during a call, control the display unit to cease displaying the plurality of icons.

8. The mobile communication terminal of claim 7, wherein, during a call, all of the incoming phone number, the elapsed time, and the plurality of icons are displayed below the notification on the display unit.

9. The mobile communication terminal of claim 8, wherein the incoming phone number, the elapsed time, the plurality of icons, and the notification occupy a majority of a display screen space of the display unit.

10. A mobile communication terminal operable for receiving an incoming voice call, the mobile communication terminal comprising:
- a display unit;
- a communication interface; and
- a processor configured to,
  - when a call request is received from a base station via the communication interface, respond to the call request via the communication interface and then perform call-set up with the base station via the communication interface,
  - once a call has been set up, control the display unit to automatically display a plurality of icons together with a notification indicating a network state and a battery state, an incoming phone number of the call, and an elapsed time of the call,
    - wherein the plurality of icons are respectively associated with voice communication related functions, and
    - wherein at least one of the plurality of icons includes a graphic symbol portion and a text portion,
  - when an input selecting one of the plurality of icons is received during a call, perform a voice communication related function associated with the selected icon; and
  - during a call, control the display unit to stop display of at least one of the plurality of icons and then to re-display the at least one of the plurality of icons.

11. A method for a mobile communication terminal operable for receiving an incoming voice call, the method comprising:
- receiving a call request for a voice call between the mobile communication terminal and a counterpart from a base station;
- responding to the call request and then performing call-setup with the base station;
- once the voice call between the mobile communication terminal and the counterpart has been set up, automatically displaying a plurality of icons together with a notification indicating a network state and a battery state, an incoming phone number of the voice call, and an elapsed time of the voice call,
  - wherein the plurality of icons are respectively associated with voice call related functions, and the mobile communication terminal starts to display the plurality of icons associated with the voice call related functions after the voice call between the mobile communication terminal and the counterpart is set up,
  - wherein each of the plurality of icons includes a graphic symbol portion and a text portion, and
  - wherein all of the incoming phone number, the elapsed voice communication time, and the plurality of icons are displayed below the notification during the voice call;
- when an input is received selecting one of the plurality of icons during the voice call, performing a voice call related function associated with the selected icon.

12. The method of claim 11, further comprising:
stopping displaying the plurality of icons on the display unit.

13. The method of claim 11, wherein the voice call related functions include at least one of a mute function and a phone directory.

14. A method for a mobile communication terminal operable for receiving an incoming voice call, comprising:
- receiving a call request from a base station;
- responding to the call request and then performing call-setup with the base station;
- once the call has been set up, automatically displaying a plurality of icons together with a notification indicating a network state and a battery state, an incoming phone number of the call, and an elapsed time of the call,
  - wherein the plurality of icons are respectively associated with voice communication related functions,
  - wherein at least one of the plurality of icons includes a graphic symbol portion and a text portion,
- when an input is received selecting one of the plurality of icons during a call, performing a voice communication related function associated with the selected icon; and
- preventing, according to a predefined condition, display of at least one of the plurality of icons during a call.

15. The method of claim 14, wherein the predefined condition comprises a user not inputting a selection from the plurality of icons for a predetermined display time.

16. The method of claim 14, wherein the predefined condition comprises a user having previously deleted the at least one icon from the plurality of icons to be displayed during a call.

17. A method for a mobile communication terminal operable for receiving an incoming voice call, comprising:
- receiving a call request from a base station;
- responding to the call request and then performing call-setup with the base station;

once the call has been set up, automatically displaying a plurality of icons together with a notification indicating a network state and a battery state, an incoming phone number of the call, and an elapsed time of the call,
wherein the plurality of icons are respectively associated with voice communication related functions,
wherein at least one of the plurality of icons includes a graphic symbol portion and a text portion,
when an input is received selecting one of the plurality of icons during a call, performing a voice communication related function associated with the selected icon; and
when a predetermined display time elapses during a call, ceasing displaying the plurality of icons.

18. The method of claim 17, wherein all of the incoming phone number, the elapsed time, and the plurality of icons are displayed below the notification.

19. The method of claim 18, wherein the incoming phone number, the elapsed time, the plurality of icons, and the notification occupy a majority of a display screen space.

20. A method for a mobile communication terminal operable for receiving an incoming voice call, comprising:
receiving a call request from a base station;
responding to the call request and then performing call-setup with the base station;
once the call has been set up, automatically displaying a plurality of icons together with a notification indicating a network state and a battery state, an incoming phone number of the call, and an elapsed time of the call,
wherein the plurality of icons are respectively associated with voice communication related functions,
wherein at least one of the plurality of icons includes a graphic symbol portion and a text portion,
when an input is received selecting one of the plurality of icons during a call, performing a voice communication related function associated with the selected icon; and
during a call, stopping display of at least one of the plurality of icons, and then re-displaying the at least one of the plurality of icons.

* * * * *